United States Patent [19]

Anderson, deceased et al.

[11] Patent Number: 4,941,431

[45] Date of Patent: Jul. 17, 1990

[54] SYSTEM FOR HANDLING LABORATORY ANIMALS

[76] Inventors: Francis G. Anderson, deceased, late of Moyock; by Dorothy S. Anderson, executor, Rte. 2, Box No. 93M, Baxter Estates, Moyock, both of N.C. 27958

[21] Appl. No.: 284,095

[22] Filed: Dec. 14, 1988

[51] Int. Cl.⁵ .................................... A01K 29/00
[52] U.S. Cl. .................................... 119/1; 119/15
[58] Field of Search .................. 119/1, 15, 17, 160

[56] References Cited

U.S. PATENT DOCUMENTS

| | | | |
|---|---|---|---|
| 1,775,703 | 9/1930 | Stokes . | |
| 1,863,584 | 6/1932 | Tracy . | |
| 2,965,936 | 12/1960 | Kaye | 21/91 |
| 2,989,381 | 6/1961 | Musser | 23/281 |
| 3,343,520 | 9/1967 | Schwarz, Jr. | 119/15 |
| 3,386,417 | 6/1968 | Machowski | 119/1 |
| 3,537,428 | 11/1970 | Montgomery | 119/15 |
| 3,828,731 | 8/1974 | White | 119/1 |
| 4,343,304 | 8/1982 | Hickman | 119/15 |
| 4,365,590 | 12/1982 | Ruggieri et al. | 119/15 |
| 4,402,280 | 9/1983 | Thomas | 119/15 |
| 4,480,586 | 11/1984 | Lague et al. | 119/15 |
| 4,528,941 | 7/1985 | Spengler | 119/15 |
| 4,593,650 | 6/1986 | Lattuada | 119/15 |
| 4,619,862 | 10/1986 | Sokolowski et al. | 119/1 |
| 4,640,225 | 2/1987 | Yananton | 119/1 |
| 4,640,228 | 2/1987 | Sedlacek et al. | 119/15 |
| 4,690,100 | 9/1987 | Thomas | 119/15 |
| 4,699,088 | 10/1987 | Murray et al. | 119/15 |

OTHER PUBLICATIONS

"Guide for the Care and Use of Laboratory Animals", U.S. Department of Health and Human Services, pp. 38-39.
1986 Report of the AVMA Panel on Euthanasia, Journal of the American Veterinary Medical Association, vol. 188, No. 3, pp. 252-268.

Primary Examiner—Paul J. Hirsch
Attorney, Agent, or Firm—Dann, Dorfman, Herrell & Skillman

[57] ABSTRACT

A system for treating laboratory animals with a gaseous medium while the animals are in the laboratory cage. The system includes a limited number of lids adapted to fit the entire range of standard laboratory plastic cages. The lids are in three sizes, each size designed to cooperate with a different group of the cages. The system includes means to supply gaseous medium to one or more of the lids and includes controls having predetermined settings to regulate the rate of flow and the period of flow of the gaseous medium to the lids to provide a volume of medium selected according to the size of the cage to obtain efficacious treatment of the animals.

18 Claims, 1 Drawing Sheet

SYSTEM FOR HANDLING LABORATORY ANIMALS

FIELD OF THE INVENTION

The present invention relates to the treatment of laboratory animals, and more particularly relates to a method and apparatus for humanely and painlessly destroying laboratory animals following the performance of laboratory tests and experiments.

BACKGROUND OF THE INVENTION

Prior to the present invention, there has been no uniform procedure for destroying laboratory animals following completion of the tests or experiments involving such animals. The industry does not have an established protocol for destruction of the animals. In some instances, the care with which the technicians handle the animals during their destruction is less than humane and it has been found desirable to provide a method and system which facilitates the disposal of the animals in a humane and painless fashion while at the same time avoiding excessive costs or the need for monitoring the disposal by highly paid professionals.

A commonly-used procedure is to provide a container into which a block of frozen solid $CO_2$ (dry ice) is placed. As the $CO_2$ sublimes, the container fills with gaseous $CO_2$, and when the animals are dumped into the container, they suffocate, and the animals are then cremated or otherwise disposed of. Such a procedure does not have controls to assure proper concentration of $CO_2$ to insure a painless death, and the animals may come into contact with the frozen $CO_2$. In other laboratories, the animals are simply guillotined. A more humane procedure which is used for larger animals is to use a lethal injection, which requires individual handling of the animals by a skilled technician.

With the foregoing in mind, the present invention provides a method and system for destroying laboratory animals in a humane and painless fashion which may be operated by relatively unskilled technicians routinely with small risk for improper handling of the animals.

SUMMARY OF THE INVENTION

The present invention provides a method and apparatus for destroying laboratory animals without the need for removing them from the cages in which the tests and/or experiments are performed. Modern laboratory cages are normally plastic open-topped enclosures which are imperforate and are closed at the top by a mesh barrier through which food, water and other life support may be supplied to the animal. Specifically, the present invention provides means for destroying the laboratory animals by asphyxiation in a manner which avoids subjecting the animals to pain or inhumane treatment. The asphyxiation is preferably accomplished with the use of carbon dioxide gas which first causes the animal to lose consciousness and then asphyxiates the animal painlessly.

In order to avoid unnecessary expense, the present invention provides for accurate control of the administration of the asphyxiating medium to the animal so that a sufficient quantity of the asphyxiating medium is provided to assure painless death of the animal and yet avoids the supply of excess medium which is unnecessary, once the animal is exposed to the full effect of the asphyxiating medium.

The present invention provides for injection of a predetermined volume of the asphyxiating medium into the animal cage so that the medium, being heavier than air, fills the bottom of the cage to a level above the respiratory system of the laboratory animal so as to assure that the animal is subject to the full effect of the medium.

Since laboratories normally use a wide variety of cages, depending upon the number of animals to be treated together, the size of the animals, and the need for different life support systems to be used during the laboratory procedures for the tests and experimentation, the present invention provides a system which accommodates itself to a wide range of cages but is designed with a limited assortment of equipment which may be operated by a relative unskilled technician to be fully effective in operation and use.

Specifically, the present invention provides a lid for covering the laboratory cage after removal of the feeding and watering devices or other life support systems used during the course of the test or experiment, the lid having coupled to it means to supply gaseous medium into the cage in a fashion to cause the gaseous medium, being heavier than air, to accumulate at the bottom of the cage, displacing the air normally present through suitable exhaust ports in the lid.

To accommodate a wide variety of cages, the lids are designed in a limited number of sizes, each size adapted to cooperate with a selected group of cages. The selection of cages with which the lid cooperates is made so that the amount of gaseous medium supplied to each lid may be fixed in an amount sufficient to provide the proper volume of medium in the cage to effectively treat the animal therein.

BRIEF DESCRIPTION OF THE DRAWINGS

All of the objects of the invention are more fully set forth hereinafter with reference to the accompanying drawing, wherein.

DESCRIPTION OF THE PREFERRED EMBODIMENT

Figure 1:
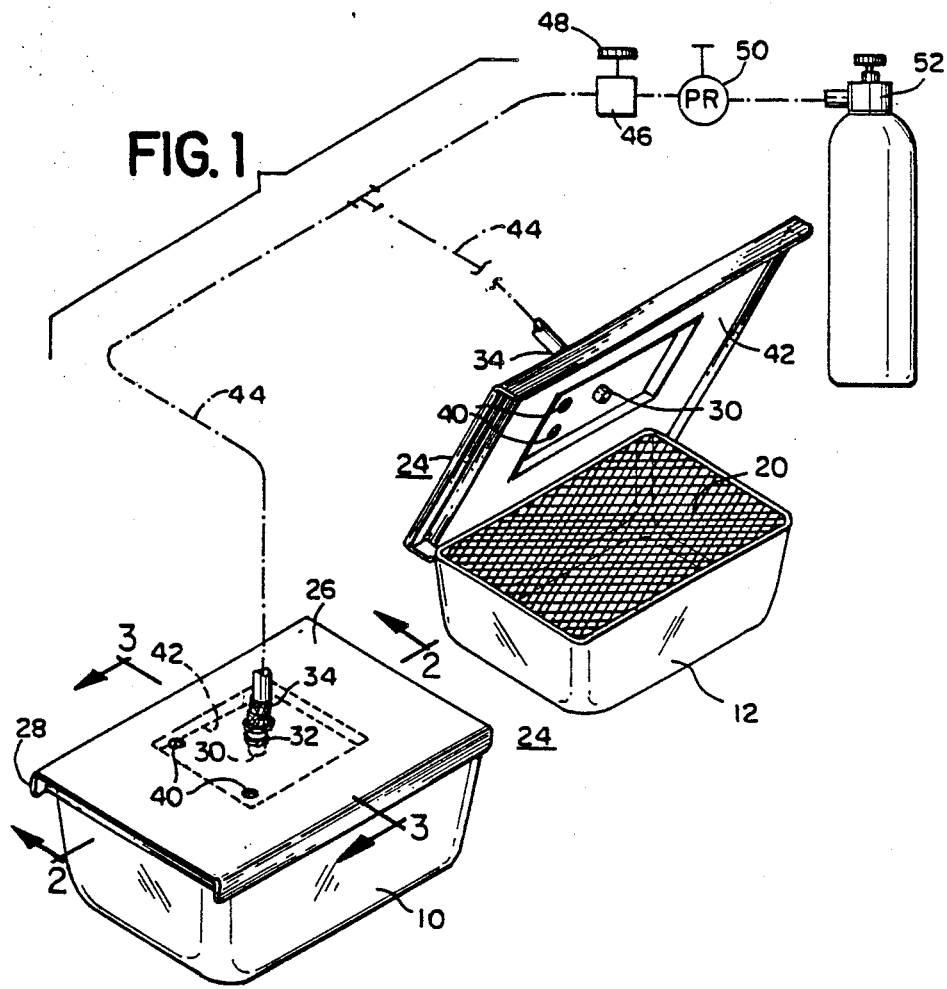
FIG. 1 is a schematic view showing the system of the present invention showing two lids of the same size covering cages of different sizes.
Figure 2:
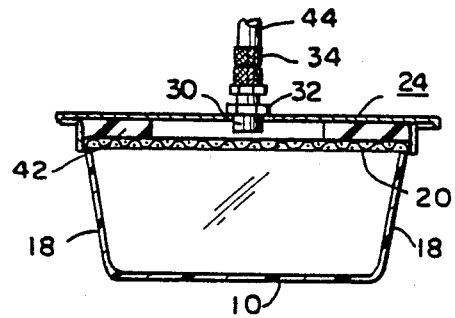
FIGS. 2 and 3 are transverse and longitudinal sectional views taken on the lines 2—2 and 3—3, respectively, of FIG. 1.
Figure 3:
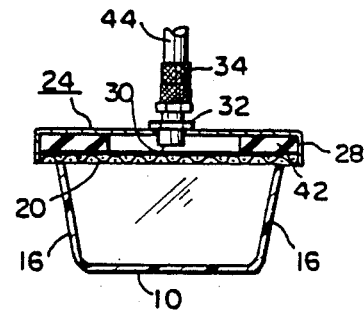

The system of the present invention is particularly adapted for use in laboratories and research facilities in which tests and experiments are performed on animals which are kept in plastic cages. Plastic cages are supplied in various sizes, according to the number of animals to be housed in the cage, and the species or variety of animal on which the testing or experimentation is to be performed. As shown in the drawings, the standard plastic cage consists of a bottom panel and four upstanding side walls to form a generally rectangular enclosure. The bottom panel end walls are made from a suitable plastic material which is readily cleaned and sterilized and is not subject to deterioration from exposure to the animals, their droppings, or the food or other materials which are administered to the animal during tests or experiments.

The plastic cages are normally covered with a mesh barrier of wire or other material to afford ventilation of the cage while maintaining the animal within the enclosure. For short procedures, the mesh barrier is sufficient to provide air to the animal which is the only life support needed. For longer procedures, the animals require food and water and normally water bottles are incorporated in the mesh barrier to enable watering of the animal during the test period. For prolonged periods when food is administered to the animals, feeding devices may also be incorporated in the barrier of the cage. For more sophisticated procedures, the wire mesh may be replaced or supplemented with a more complex life support system which may include suitable monitors and other automatic devices to monitor and maintain the life support during the procedure.

The illustrated cages shown at 10 and 12 are simplified structures, each including a bottom panel 14, front and rear panels 16 and end panels 18, which are interconnected about the imperforate periphery of the bottom panel to provide an enclosure for the animal. Each cage is also provided with a mesh barrier 20 which, in the present instance, is fitted around the top margin of the upstanding walls 16 and 18. The walls 16 and 18 are imperforate for their full extent so as to provide a suitable enclosure for the animals.

The present invention is designed to enable the laboratory personnel to efficiently and effectively attend to the destruction of the laboratory animals at the conclusion of the tests or experimental procedures. The method and apparatus of the present invention enables the animals to be destroyed painlessly and humanely without removing the animals from the cages in which the procedures were last performed. Thus, the animals need not be handled by the laboratory technicians. To this end, the system of the present invention incorporates lids which fit on the cages, and means to supply a gaseous medium to the cages in an efficient and effective manner. Specifically, the system incorporates control means which enables the introduction of the proper quantity of gaseous medium into the cages without need for highly skilled supervision of this procedure.

In the illustrated system, there is provided a pair of lids 24, which in the present instance are of the same size and configuration. Each lid has a cover panel 26 of a length and width greater than the length and width of all of the cages to which the lids are to be applied. Surrounding the cover panel 26 is a depending flange 28 which is continuous about the entire periphery of the panel along its marginal portion. The flange is dimensioned to circumscribe the upper perimeter of all of the cages to which the lid may be applied so as to ensure proper positioning of the lid on the cage. The marginal flange also serves to reinforce the lid and provide a structural rigidity, enabling the material of the lid to be of a lighter gauge than would otherwise be possible. In the present instance, the lid is formed of a suitable sheet material such as stainless steel or the like, so that it may be readily sterilized and cleansed.

An inlet 30 is provided through which a gaseous medium may be introduced into the cage. In the present instance, the inlet 30 is centrally located within the cover panel 26 and is provided with a ferrule or receptacle 32 for attachment of a quick-disconnect fitting 34 thereto, as will be described hereinafter. Also, within the cover panel 26 is a pair of exhaust ports 40 which, in the present instance, are located between the inlet 30 and one end of the panel. The ports are spaced inwardly from the peripheral flange 28 a wide distance at both the side and the end so as to permit the same lid to be applied to a wide variety of different cages.

Between the exhaust ports 40 and the flange 28 on the underside of the cover panel 26, a gasketing material 42 is provided. As shown, the gasketing material extends about the marginal portion of the lid panel 26 so as to provide a generally hollow rectangular seating area for engaging the upper edges of the upstanding walls 14 and 16 of the cages. The gasketing material may be made of a disposable foam composition which may be installed in the lid prior to fitting the lid on the cages, and then may be removed and discarded when the lid is thereafter removed from the cages. After removal of the disposable gasketing 42, the lid may be sterilized, for example in a standard autoclave. The flange 28 surrounding the lid panel 26 is provided with appropriate elements which cooperate with the gasketing material to retain it in position within the lid during installation and use. Alternatively, the gasketing material may be a soft rubber or foam material which is readily cleaned and sterilized, as needed, for repeated use.

In accordance with the invention, means is provided to supply gaseous medium to the inlet 30 so as to introduce a controlled quantity of the medium into the cage under the lid. In order to enable the operation of the system by relatively unskilled laboratory personnel, the gas supply means includes controls to limit the rate of flow of gaseous medium through the inlet port 30, and means to control the overall volume of gaseous medium supplied to the cage. To this end, each quick-disconnect fitting 34 is connected to a branch line 44 which leads to a valve 46. The valve 46 has an internal orifice (not shown) which passes gaseous medium to the branches 44 for a timed interval. The valve 46 may be operated manually for a selected time period as indicated on a control timer 48, or may be operated automatically under the control of the timing control or timer 48. Upstream of the valve 46 is a pressure-regulator valve 50 which, in turn, is connected to a source 52 of gaseous medium. The regulator 50 operates to supply gaseous medium to the valve 46 at a selected pressure so as to assure a regulated flow of gaseous medium to the branches 44. If desired, the pressure in the branches 44 may also be monitored. The pressure set by the regulator 50 determines the flow through the orifice and the timed flow determines the overall volume of gaseous medium which passes through the valve. Thus, by regulating the pressure, the rate of flow through the inlets 30 in the respective lids is controlled.

The ferrule 32 at the inlet port at 30 is designed to afford entry of gaseous medium into the cages 10 and 12 without substantial turbulence. In the present instance, the ferrule provides an inlet port with a $\frac{1}{8}$ inch opening. With a pressure of 12 psig, there is no turbulence as the gaseous medium enters the cage. Thus, the gaseous medium flows gradually into the cage and is free to settle to the bottom of the cage. The two exhaust ports 40 limit the discharge of the gaseous medium, so that it accumulates within the cage and is not diluted by the surrounding atmosphere. The timed flow assures that a sufficient volume of gaseous medium is introduced into the cage so that the gas, being heavier than air, fills the bottom of the cage to a level above the level of the respiratory system of the animal in the cage. In this fashion, the animal is immersed in the gaseous medium supplied through the valve 46.

Preferably, the gaseous medium in the supply canister 52 is carbon dioxide which is not considered dangerous to laboratory personnel. However, when confined in a limited space so as to displace the oxygen to a degree where the oxygen content becomes less than 35 or 40%, carbon dioxide functions first to promptly anaesthetize the animal and thereafter to asphyxiate the animal, thereby providing a painless and humane treatment of the animal at the conclusion of the experiment. Exposure to an atmosphere of 60% $CO_2$ for a period of ten minutes is more than sufficient to asphyxiate the animal.

The flow through the branches 44 and the fittings 34 is controlled so that the volume of gaseous medium introduced into the cages is sufficient to fill the bottom of the cages above the level of the respiratory system of the animal in the cage, but is not sufficiently great to cause substantial overflowing of the gaseous medium through the exhaust ports 40. The ports 40 are sufficiently restricted to control the exhaust of the gaseous medium and to permit a gradual displacement of the air from the cage through the ports 40 as carbon dioxide is introduced through the port 30. By avoiding turbulence during the introduction of the carbon dioxide, it settles quickly to the bottom of the cage and is not discharged with the air which it displaces to any substantial degree, nor does it become diluted by infusion of outside air. In this fashion, the amount of carbon dioxide used in the treatment is minimized to that level which is desired to assure asphyxiation of the animal.

When equipping a conventional laboratory to utilize the system of the present invention, the equipment may include a canister which may be stored in a wall-mounted or bench-top cabinet, or may include a cart-mounted cylinder or other supply of gaseous medium along with a pressure-regulator 50, a valve 46, and timer 48.

Preferably, for a laboratory which conducts tests and experiments on a limited number of animals at a time, for example one or two, the system provides a lid for each laboratory station where tests are conducted. A laboratory of this nature may use cages ranging in size from the 400 cubic inch mouse cage to the 2560 cubic inch guinea pig cage. It has been found that the system of the present invention may accommodate all of these cages by the use of three different lids, each lid being designed to cover a selected group of the various size cages which are normally available in the laboratory.

The small lid is effective to cover cages ranging in size from the 340 cubic inch mouse cage up to the 800 cubic inch rat cage. The medium size lid will cover cages ranging from the 800 cubic inch rat cage to the 1 cubic foot cage, and a third lid may cooperate with cages with sizes up to one and one-half cubic feet. For the small lid, the carbon dioxide is supplied at a pressure of 12 psig for each lid for a time interval of 30 seconds. For the medium and large lids, the pressure of the carbon dioxide is increased to 20 psig and the time interval for the medium lid is one minute, whereas the time interval for the large lid is 1.5 minutes. These time intervals are sufficient to fill the bottom of the cages with carbon dioxide to a level above the respiratory system of the animals in the cages so as to assure painless and humane asphyxiation. The gas is retained in the cage for a suitable period, for example 5 minutes, to assure full effect of the gaseous medium upon the animal. After the period of exposure, the animal carcasses may be disposed of. Preferably, the timer 48 is effective to assure that the animal is exposed to the $CO_2$ atmosphere for the desired period before it is removed. If desired, a signal may be produced when the desired period has elapsed after closure of the valve 46.

In designing the system with lids of three different sizes, the exhaust ports 40 in all of the lids are of the same size and are spaced apart by the same distance, for example ⅜ inch diameter holes on 5.0 inch centers. These ports may be employed to suspend the lids on support brackets having a pair of support arms which are spaced apart by the same distance, e.g. in the example, ¼ inch diameter rods on 5.0 inch centers.

The system of the present invention may be also used to anaesthetize animals in cages. If the animal is subjected to carbon dioxide for a brief period, it loses consciousness and is effectively anaesthetized. However, the likelihood of overexposure or underexposure makes it advisable to use a different anesthetizing medium than carbon dioxide. For example, a suitable anaesthetic gas may be substituted which will have the effect of anaesthetizing the animal without danger of asphyxiation. When using gases of this nature, the cages are placed in the vicinity of a laboratory exhaust hood and air is exhausted through the hood at a rate to entrain any asphyxiating medium exhausted through the exhaust ports 40 of the lids. Hoods are also used when there is a likelihood of contamination of the ambient air by the animals undergoing the test procedures, or in any case where the laboratory protocol requires it.

In order to facilitate the operation of the system by minimally skilled personnel, the timer valve and the pressure regulator have a series of individual settings which may be labelled with suitable indicia, for example "A" through "G" for the timer 48 and "R" through "U" for the pressure regulator 50. The operator is then given a chart which indicates, for example, that when using Lid No. 1 (the small lid) with a single cage, the timer is set at A, the pressure regulator set is set at R. For other conditions, the settings are given in simple and straightforward manner so that there is little risk of error on the part of the operator.

The quick-disconnect fittings 34 are of a nature to close the branch 44 when the fitting 34 is disconnected from the ferrule 32 in the port 30. In this way, it is not necessary to shut off the valve when changing the fittings from one lid to the next. The fittings 34 may also serve the function of the valve 46 to control the flow through the inlet 30, if desired. If the timer 48 is used to time the exposure period, it may be simply reset to provide an appropriate delay when the fitting 34 is disconnected so as to assure prompt treatment according to the criteria set forth above.

In some laboratories, the cages are provided with biodegradable liners prior to the insertion of the animals in order to facilitate the handling of the animals at the conclusion of the test or experimental procedures. The liners are inserted before placing the animal in the cage, and are removed with the animal at the conclusion of the procedure. The present invention may be used effectively in such systems without modification since the injection of the gaseous medium into the cage is not adversely affected by the presence of the liner therein.

The principle of the invention is also applicable to a system in which the individual animals are accumulated and placed in a large container, in some cases with the disposable liner serving as the enclosure for the animal. The container is supplied with a lid which may be comparable to the lids 24 but sized to fit the large container and the controls may be regulated to assure filling the bottom of the large container with a sufficient volume of gaseous medium to assure humane and painless asphyxiation of all of the animals within this large container.

In order to assure proper control, the controls for the supply of gaseous medium, as in the previously described embodiments, have predetermined settings which establish the necessary volume of gaseous medium to be injected into the large container to assure painless and humane treatment of the animals therein.

While a specific embodiment of the invention has been illustrated and other embodiments have been described, changes or modifications may be made therein and thereto within the scope of the following claims.

I claim:

1. A method of handling laboratory animals used for performing tests comprising the steps of:
   providing at least one animal compartment dimensioned to accommodate at least one laboratory animal therein, said compartment having a bottom panel which is imperforate within a given perimeter, and upstanding side panels around the perimeter of said imperforate bottom panel to define an enclosure for the animal, said enclosure having an upper opening;
   depositing a living animal having a respiratory system in said enclosure;
   providing life support to said animal through said upper opening and performing laboratory tests by treating said animal while in said enclosure so as to obtain test results;
   thereafter providing a closure for said upper opening and introducing $CO_2$ into enclosure through said closure and mixing the $CO_2$ with the air in the enclosure to provide first a concentration of $CO_2$ sufficient to anesthetize the animal;
   mainting the flow of said $CO_2$ for a time period to produce a selected volume of $CO_2$ sufficient to fill the bottom of said enclosure with a second concentration of $CO_2$ to a level higher than the height of the animal's respiratory system; and
   restricting the exhaust of any gaseous medium from the enclosure, thereby maintaining the level of said concentration of $CO_2$ in said enclosure for a time period to subject said animal to the asphyxiating effect of said $CO_2$ concentration.

2. A method according to claim 1 wherein said flow and said level are maintained by providing a timer and a predetermined orifice means, supplying said $CO_2$ through said orifice means at a selected pressure to control the rate of flow therethrough, and controlling the volume of flow by timing the length of flow through said orifice means in correlation to said selected pressure.

3. A method according to claim 1 wherein said step of providing a closure for said opening includes the steps of providing plural lids, each lid being different and being sized to fit the upper openings of a separate group of compartments, selecting a lid to fit the said animal compartment, and maintaining the flow of $CO_2$ for a time period determined by said selection of a lid.

4. A method according to claim 3 wherein each lid has an inlet means, exhaust port means, and means to limit the escape of gaseous medium from said compartment except through said exhaust port means, including the step of restricting the flow through said exhaust port means to assist in maintaining the level of said $CO_2$ in said enclosure.

5. A method according to claim 1 including the step of placing said compartment in the vicinity of an exhaust hood and exhausting air through said hood at a rate to entrain any gaseous medium exhausted from said compartment.

6. A method of handling laboratory animals used for performing tests comprising the steps of:
   providing at least one animal compartment dimensioned to accommodate at least one laboratory animal therein, said compartment having a bottom panel which is imperforate within a given perimeter upstanding side panels around the perimeter of said imperforate bottom panel to define an enclosure for the animal, said enclosure having an upper opening;
   depositing a living animal having a respiratory system in said enclosure;
   applying a lid to said upper opening, said lid having inlet means, exhaust port means, and gasket means surrounding said inlet means and exhaust port means to register with said upper opening and close the same and enclose the animal within said enclosure;
   after application of said lid, introducing a flow of gaseous $CO_2$ into said opening through said inlet means; and
   controlling the flow of $CO_2$ to produce and maintain a volume of gaseous medium in the bottom of said enclosure sufficient to fill the bottom with an asphyxiating concentration of $CO_2$ to a height above the level of the respiratory system of the animal in the enclosure, and maintaining the volume for a timed period to subject the animal to the asphyxiating effect of said concentration of $CO_2$.

7. A method according to claim 6 including the step of inserting a removable liner in said enclosure before depositing the animal therein and removing said liner with said animal after the animal has been subjected to the desired effect of said medium.

8. A method according to claim 7 including the step of forming said liner from biodegradable materials.

9. Apparatus for handling laboratory animals having a respiratory system following performance of laboratory tests while said animals are in one standard enclosure selected from a group of different enclosures, each enclosure of the group having an imperforate bottom and a top opening providing a different volume for affording life support to said animals in said enclosure;
   a group of lids for said enclosures, each said lid dimensioned and arranged to engage the top opening of a different one of said standard enclosures to provide a closure about the perimeter of said opening, exhaust port means within said perimeter to afford limited escape of air from said enclosure, and inlet port means for introducing gaseous $CO_2$ into said enclosure; and
   means to supply gaseous $CO_2$ to said inlet port including flow regulating means to effect a predetermined rate of flow of said $CO_2$ to said inlet port to displace air from said enclosure through said exhaust port means; and timer means having a plurality of different time settings, one associated with each different enclosure, to control the duration of the flow from said regulating means so as to introduce a given volume of said $CO_2$ into said enclosure, each of said plurality of time settings providing a flow duration which is sufficient to provide a given volume of $CO_2$ to fill the bottom of the associated one of said enclosures with a concentration of $CO_2$ sufficient to asphyxiate the laboratory animal.

10. Apparatus according to claim 9 for use with selected different standard enclosures ranging in volumes from 0.5 to 1.5 cubic feet, wherein
said flow regulating means provides multiple flow settings, each flow setting being associated with one part of said range of volumes,
each of the said time settings being correlated to at least one of said multiple flow settings.

11. Apparatus according to claim 9 including:
an additional lid for an additional enclosure, said additional lid having exhaust port means and inlet port means;
said means to supply gaseous $CO_2$ including a branch for each lid downstream of said flow regulating means, each branch connecting said regulating means to the inlet port means of the associated lid, and
said regulating means introducing said given volume of $CO_2$ into each of said enclosures.

12. Apparatus according to claim 11 wherein said flow regulating means has a control to increase said predetermined flow rate according to the number of branches, to thereby supply said given volume to each of said enclosures.

13. Apparatus according to claim 9 for use with plural groups of standard enclosures, said lid being sized for one of said groups of enclosures, and including a second lid sized for a second of said groups of enclosures, one of said time settings being the same for all enclosures in the one group, and a second of said time settings being the same for al enclosures in the second group, each setting being identified with the associated lid, whereby said time setting is selected according to which a lid is selected.

14. Apparatus according to claim 13 wherein the exhaust port means of each lid comprises a pair of exhaust openings of a given diameter spaced apart a given distance, said given diameter and said given distance being respectively identical in all of said lids.

15. Apparatus according to claim 9 including a flexible conduit connecting said inlet port to said supply means to allow movement of said lid without moving said supply means, said conduit including a quick-disconnect fitting to afford disconnection of said lid from said supply means and to close said conduit when disconnected.

16. Apparatus according to claim 9 wherein said lid has an edge flange depending form said lid about its entire periphery, and gasket means on the underside of said lid to engage the perimeter of said top opening and restrict escape of gaseous medium between said lid and said opening.

17. Apparatus according to claim 16 wherein said exhaust ports are spaced inwardly from said flange a given distance, and said gasket extends from said flange inwardly toward said ports a distance at least as great as said given distance, whereby said lid is adapted to engage a plurality of different enclosures.

18. Apparatus according to claim 9 wherein said inlet port means includes means to cause said medium to flow into said enclosure without substantial turbulence, thereby allowing said gaseous $CO_2$ to settle to the bottom of said enclosure and displace air upwardly and out through said exhaust port means.

* * * * *

UNITED STATES PATENT AND TRADEMARK OFFICE
CERTIFICATE OF CORRECTION

PATENT NO. : 4,941,431

DATED : July 17, 1990

INVENTOR(S) : Francis G. Anderson, deceased, by Dorothy S. Anderson, Executor

It is certified that error appears in the above-identified patent and that said Letters Patent is hereby corrected as shown below:

Col. 7, line 35, "mainting" should be --maintaining--;

Col. 9, line 33, "al" should be --all--.

Signed and Sealed this

Twenty-seventh Day of August, 1991

Attest:

HARRY F. MANBECK, JR.

Attesting Officer

Commissioner of Patents and Trademarks